United States Patent [19]
Stingel, Jr. et al.

[11] Patent Number: 6,048,166
[45] Date of Patent: Apr. 11, 2000

[54] GANTRY DEPALLETIZER

[76] Inventors: Frederick J. Stingel, Jr., 8 Cedar Chine, Biltmore Forest, N.C. 28803; Frederick J. Stingel, III; Jeffrey W. Stingel, both of 115 Vista Blvd., Arden, N.C. 28704

[21] Appl. No.: 09/312,807

[22] Filed: May 17, 1999

Related U.S. Application Data

[62] Division of application No. 09/036,261, Mar. 6, 1998
[60] Provisional application No. 60/040,127, Mar. 7, 1997.

[51] Int. Cl.[7] .................................................. B65G 59/02
[52] U.S. Cl. ............................ 414/796.9; 294/119.1; 294/87.1; 414/626
[58] Field of Search ................................ 294/119.1, 87.1, 294/113, 907; 414/788.9, 795.7, 796.9, 626; 901/39, 16, 46, 48

[56] References Cited

U.S. PATENT DOCUMENTS

| | | |
|---|---|---|
| 3,074,595 | 1/1963 | Boller . |
| 3,195,741 | 7/1965 | Raynor . |
| 3,448,867 | 6/1969 | Raynor et al. . |
| 3,534,872 | 10/1970 | Roth et al. . |
| 3,716,147 | 2/1973 | Pipes ........................................... 214/1 |
| 4,019,620 | 4/1977 | Frenkel et al. ........................... 198/399 |
| 4,032,022 | 6/1977 | Smith ........................................ 214/8.5 |
| 4,252,496 | 2/1981 | Williams ................................... 414/623 |
| 4,493,599 | 1/1985 | Hartness et al. ......................... 414/120 |
| 4,850,782 | 7/1989 | Focke ......................................... 901/48 |
| 4,911,608 | 3/1990 | Krappitz et al. ....................... 294/87.1 |
| 4,993,915 | 2/1991 | Berger et al. ............................ 414/796 |
| 5,082,319 | 1/1992 | Hurliman et al. ....................... 294/907 |
| 5,093,978 | 3/1992 | Binder ....................................... 901/16 |
| 5,127,695 | 7/1992 | Zoeten .................................. 294/119.1 |
| 5,141,274 | 8/1992 | Hayden et al. ....................... 414/796.9 |
| 5,161,934 | 11/1992 | Richardson ............................. 414/621 |
| 5,193,973 | 3/1993 | Tubke .................................. 414/796.9 |
| 5,253,974 | 10/1993 | Williams .................................. 294/113 |
| 5,360,249 | 11/1994 | Monforte et al. .................... 294/119.1 |
| 5,382,066 | 1/1995 | Kelly .................................... 294/119.1 |
| 5,451,136 | 9/1995 | Easton ...................................... 414/795 |
| 5,487,580 | 1/1996 | Kugo .................................... 294/119.1 |
| 5,582,504 | 12/1996 | Cestonaro ................................ 414/796 |
| 5,762,391 | 6/1998 | Sumnitsch ............................ 294/119.1 |

*Primary Examiner*—Douglas Hess
*Attorney, Agent, or Firm*—Quarles & Brady LLP

[57] ABSTRACT

The present invention relates to a gantry depalletizer apparatus which can be employed in removing layers of articles, such as beverage containers, from pallets. Broadly, the apparatus includes a gantry frame upon which travels a depalletizer bridge. The bridge, in turn, includes a depalletizer head which travels vertically along a pair of rails. The head employs two pairs of depalletizing arms which are utilized in grasping articles to be loaded and unloaded.

5 Claims, 5 Drawing Sheets

GANTRY DEPALLETIZER

CROSS-REFERENCE TO RELATED APPLICATIONS

This application is a division of Ser. No. 09/036,261 filed Mar. 6, 1998 which claims the benefit of provisional application Ser. No. 60/040,127, filed Mar. 7, 1997, both of which are incorporated herein by reference.

BACKGROUND OF THE INVENTION

1. Field of the Invention

This application relates to the field of gantry depalletizers, for example, of the kind adapted for removing complete layers of articles from pallets. These articles can include, for example, beverage containers, such as six-packs of beverages in cans, plastic bottles and glass bottles.

2. Description of Related Art

A grapple clamp is disclosed in U.S. Pat. No. 5,253,974 which has four clamp jaws hinged to a frame in a rectangular or square orientation so as to engage a group of objects, such as a layer of beverage containers, with equal force from four sides. One or more load stabilizer blocks are adapted for insertion into hollow or empty spaces within the interior of the layers. Blocks of different shapes and sizes must be stored and used selectively to stabilize each different size and shape of the hollow space.

A depalletizer is disclosed in U.S. Pat. No. 5,582,504, for grasping and removing rows of objects stacked upon a pallet. The depalletizer is equipped with feelers which probe the top layer on the pallet in order to find out which is the initial row present in the top layer. The probing cycle is carried out so that all the rows present in the top layer are detected, whereupon grasping of the initial row is triggered. The feelers also detect whether the top layer is oriented horizontally.

A stacker crane order picker is disclosed in U.S. Pat. No. 3,716,147, which removes a predetermined number of articles from a matrix of articles. The apparatus includes sensing means which is associated with an article pickup means and operates to sense the number of articles supported by the article pickup means.

A device for lifting at least one material stack is disclosed in U.S. Pat. No. 4,911,608, which includes sensors for detecting the distance between a gripper and the stack.

The present invention improves on the foregoing by providing an apparatus for automating depalletization. Therefore, it is an object of the present invention to provide an apparatus that can automatically stack and unstack storage pallets.

Another object of the invention is an apparatus for stacking and unstacking storage pallets that is easily adaptable for use with different load types.

Yet another object of the invention is an apparatus that can automatically load and unload pallets stacked in multiple tiers, where the pallet on each tier may contain a different load type.

Still another object of the invention is an apparatus for stacking and unstacking a pallet having an irregular or off center load thereon.

SUMMARY OF THE INVENTION

A gantry depalletizer, in accordance with the present inventive arrangement includes an apparatus for stacking and unstacking storage pallets.

More specifically, the apparatus includes a gantry frame having a first pair of racks disposed in a first direction. The apparatus further includes a depalletizer bridge employing a pair of pinions for movement along the racks of the gantry frame in the first direction. The bridge also includes pinions that are movably positioned upon a second pair of racks oriented perpendicular to the first pair of racks. The first and second racks allow the bridge to move in perpendicular directions in a horizontal plane.

First and second vertical rails extend downwardly from the bridge, with each of the rails having a rack positioned upon its inner face. A depalletizer head is adapted for vertical movement along the two vertical rails. Such movement is achieved by way of a first motor driven pinion interconnected to the first vertical rail, and a second motor driven pinion interconnected to the second vertical rail.

The depalletizer head additionally includes first and second pairs of depalletizing arms. Each of the first pair of depalletizing arms includes an angled abutment surface and two positioning racks. The first pair of depalletizing arms are geared with respect to one another by way of two pinions. In a similar fashion, the second pair of depalletizing arms each includes an angled abutment surface and two positioning racks. Additionally, the second pair of depalletizing arms are also geared with respect to one another by way of two pinions.

In an additional aspect of the invention, cable tensioners are positioned upon the depalletizer head in order to counterbalance the head. Such counterbalancing is achieved by a pair of cables which are positioned intermediate the cable tensioners and the bridge. The cables are retracted into the cable tensioners upon the charging of pneumatic cylinders contained within the cable tensioners. Retraction of the cables into the cable tensioners counterbalances the weight of the depalletizer head and reduces the load lifted by the motor driven pinions of the depalletizer head. In a further aspect of the present invention, a sensor interconnected to the depalletizer head senses the top of a load to be transported. Signals sent from the sensor cooperate with a controller for determining the vertical movement of the depalletizer head.

Yet another aspect of the invention includes a probe that depends centrally from the depalletizer head. By expanding, this probe selectively applies pressure between the center of a load to be transported and the depalletizing arms.

In some aspects, the invention additionally includes a depalletizing apparatus featuring means for automatically centering a load to be lifted when an off center position of that load is detected.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF PREFERRED EMBODIMENT

The present invention relates to a gantry depalletizer apparatus that can be employed in unloading layers of articles, such as beverage containers, from pallets. Broadly, the apparatus includes a gantry frame upon which travels a depalletizer bridge. The bridge, in turn, includes a depalletizer head that travels vertically along a pair of rails. The head employs two pairs of depalletizing arms that are utilized in grasping articles to be loaded and unloaded. These component parts of the depalletizer will be described in greater detail hereinafter.

The below described preferred embodiments illustrate adaptations of the invention. Nonetheless, from the description of these embodiments, other gantry depalletizers of the invention can be readily fashioned by making slight modifications to the components discussed below.

In brief overview, referring to FIGS. 1, 2, 3, and 4, an embodiment of gantry apparatus 10 includes framework 20, first pair of racks 22, traveling bridge 24, first drive shaft 25, pinions 26, second pair of racks 28, pinions 32, second drive shaft 33, vertical rails 34, bearings 35, hardened ways 36, bearings 37, depalletizer head 38, inner frame 39, motor driven pinions 40 and 42, drive shaft for vertical movement 41, first depalletizer arms 44, first angled abutment surface 46, first positioning racks 48, pinions 52, second depalletizing arms 54, second angled abutment surface 56, second positioning racks 58, pinions 62, cable tensioners 64, cables 66, and expansible probe lifting assistor 72.

Frame work 20 of gantry apparatus 10 is set up on four corner posts and four center posts. These posts support a series of guides and roller assemblies upon which the gantry bridge assembly travels. Such guides can take the form of linear guides which assure that the gantry bridge assembly travels in a direct line with frame work 20 (i.e., in a horizontal plane). The roller assemblies are used to support the other end of the bridge assembly. In the preferred embodiment, the posts support racks 22 which are disposed in a first direction. Bridge 24 is movably positioned upon the first pair of racks 22 via first drive shaft 25 and bearings 35. Shaft 25 is mounted to bridge 24 approximately perpendicular to racks 22, so that it spans the space between the two long sides of racks 22. Pinions 26 are located at each end of shaft 25 to allow bridge 24 to move along racks 22 of gantry frame 20 in a manner that keeps all force of acceleration equal at both ends of bridge 24. A means for powering shaft 25 such as a motor (e.g., an electric motor) provides the force to rotate shaft 25 so that bridge 24 can move back and forth in the first direction in line with frame work 20.

Bridge 24 itself includes a second pair of guides which are oriented perpendicular to the first pair of racks 22. In the preferred embodiment, these guides take the form of second pair of racks 28. The orientation of the first and second racks, 22 and 28 respectively, is most clearly referenced in FIG. 2. Bridge 24 is movably positioned upon the second pair of racks 28 via second drive shaft 33 and bearings 37. Shaft 33 is mounted to bridge 24 approximately parallel to racks 22, so that it spans the space between the two long sides of racks 28. Attached at each end of shaft 33 is a pinion 32. This pair of pinions 32 allows bridge 24 to move along racks 28 of gantry frame 20 in a manner that keeps all force of acceleration equal at both ends of bridge 24. A means for powering shaft 33 such as a motor (e.g., an electric motor) provides the force to rotate shaft 33 and thereby pinions 32 so that bridge 24 can move back and forth perpendicular to the first direction (i.e., in line with racks 28). Thus, first and second racks, 22 and 28 respectively, are oriented transverse to one another to allow bridge 24 to move in perpendicular directions in a horizontal plane.

Precision roller bearings 35 and 37 are rotatably mounted to racks 28 and inner frame 39, respectively. Bearings 35 support and facilitate movement of bridge 24 in the first direction along racks 22. In a similar fashion, bearings 37 support and facilitate movement of inner frame 39 along racks 28 in a direction perpendicular to the first direction. In the preferred embodiments, these bearings are located at each of the four corners of racks 28 and inner frame 39 (see FIG. 2).

Means for powering shafts 25 and 33 provide the force necessary to move bridge 24 throughout the horizontal plane. For example, activation of an electrical motor operatively connected to drive shaft 25 causes rotation of pinions 26 and thereby movement of racks 28 (and attached bridge 24) in one direction along and parallel to racks 22. Reversing the motor supplies a force that moves racks 28 in the opposite direction. Similarly, activation of an electrical motor operatively connected to drive shaft 33 causes rotation of pinions 32 and thereby movement of inner frame 39 (and attached bridge 24) in one direction along and parallel to racks 28. Reversing the motor causes movement of inner frame 39 in the opposite direction.

In the preferred embodiment a horizontal location control device regulates movement and accurate positioning of bridge 24 in the horizontal plane. Such device can include components such as servos, quadrature encoders attached on drive shafts 25 and 33, limit switches, and reset encoders located on predetermined positions on gantry apparatus 10. These components supply signals to a horizontal location logic controller that interprets these signals and outputs instructions regulating the movement of bridge 24 throughout the horizontal plane. For example, this output can include electrical signals sent to the means for powering shafts 25 and 33, in order to activate the means to cause forward or reverse rotation of the shafts resulting in movement of bridge 24. Additionally, as a safety feature, a failsafe device removes all power from the depalletizer if an over travel condition is reached (e.g., a quadrature encoder signals the controller to cut off power if its numerical value exceeds its preset maximum threshold).

Figure 1:
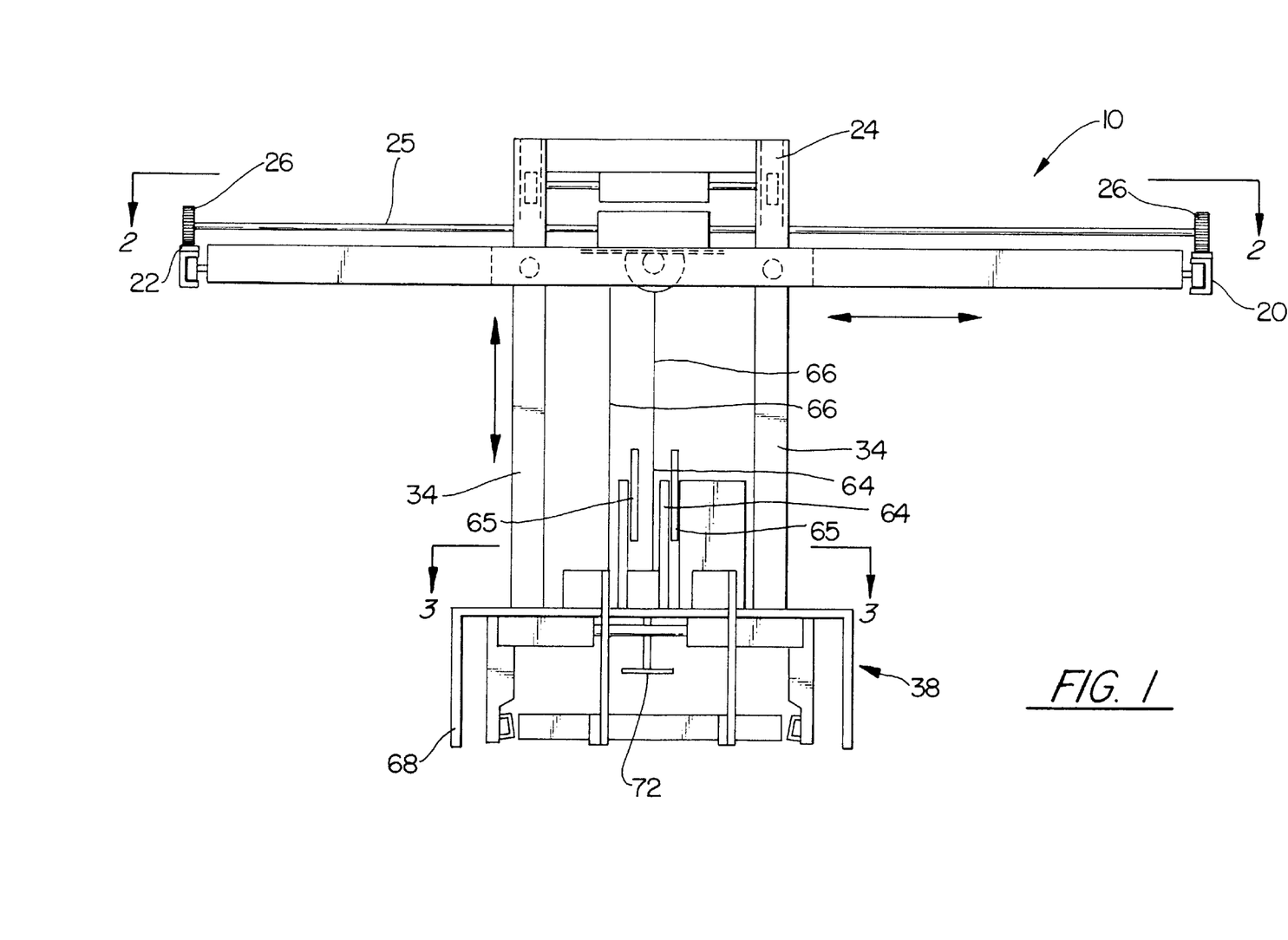
FIG. 1 is a side elevational view of the gantry depalletizer apparatus of the present invention.
Figure 2:
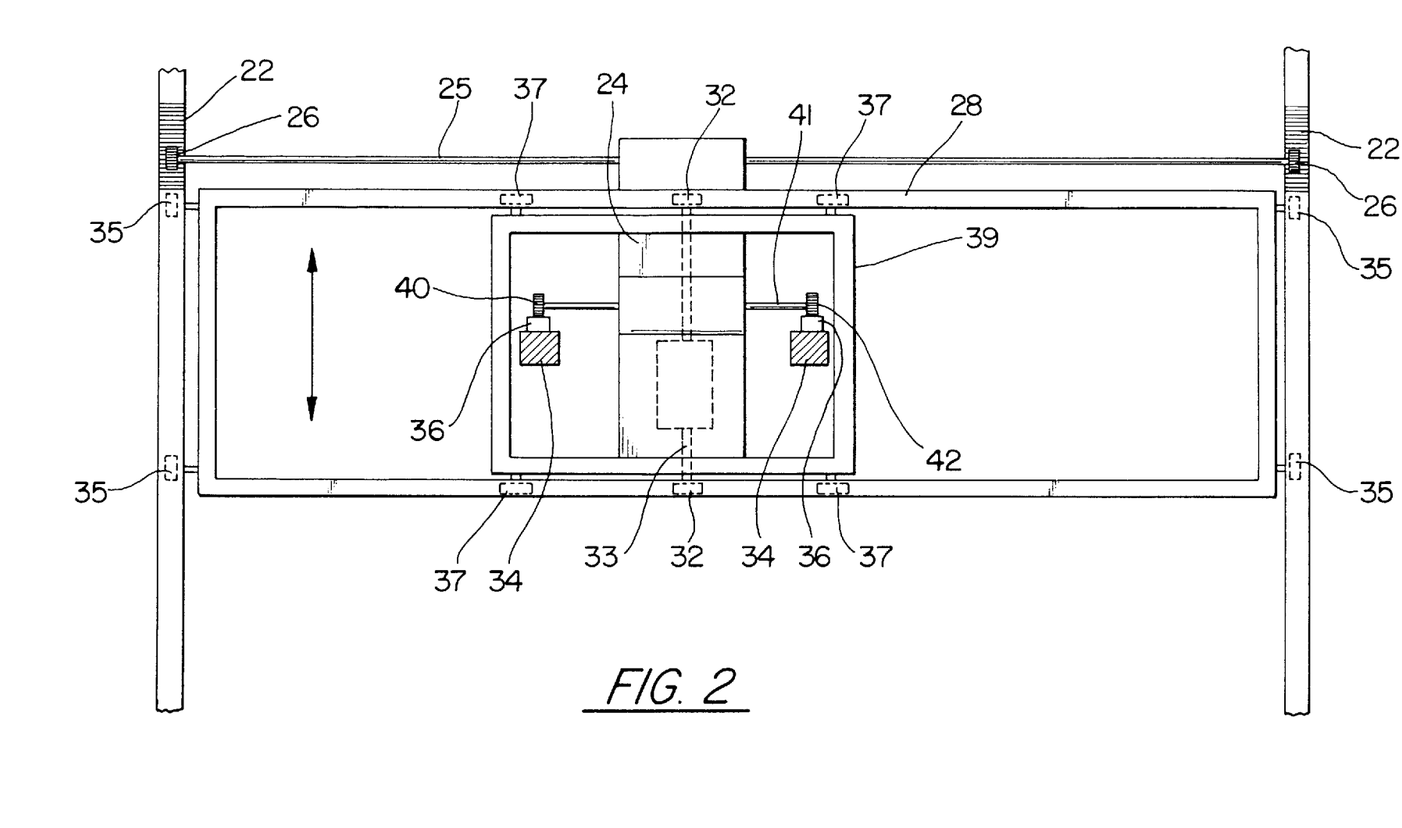
FIG. 2 is a sectional view taken along line 2—2 of FIG. 1.

With reference now to FIGS. 1 and 2, first and second vertical rails 34 of the apparatus are depicted. These rails extend downwardly from bridge 24. In the preferred embodiment, each of rails 34 has a hardened way 36 positioned upon its inner face. Vertical rails 34 facilitate the vertical travel of depalletizer head 38. Hardened ways 36 assure that head 38 is kept in a stable orientation (i.e., in a plane orthogonal to rails 34) while it moves along rails 34. More specifically, in the preferred embodiment, depalletizer head 38 includes motor driven pinions 40 and 42 that are connected to one another via drive shaft for vertical movement 41. Pinions 40 and 42 are movably connected to the vertical rails 34 via hardened ways 36. A means for powering shaft 41 such as a motor (e.g., an electric motor) provides the force to rotate shaft 41 so head 38 can move vertically along rails 34. Thus, energizing the motor driven pinions 40 and 42 results in the vertical movement of depalletizer head 38 along the length of vertical rails 34 with equal lift on both sides of depalletizer head 38. In the preferred embodiment, head 38 has precision roller bearings (e.g., two bearings mounted on each side of head 38) that guide it along the hardened ways of rails 34 and prevent it from traveling in an unaligned position.

The preferred gantry apparatus also includes a linear proportional clamping system. Such system preferably takes the form of a series of depalletizing arms adapted to engage the sides of a load to be lifted. In the preferred embodiment, there are two pairs of such arms.

Figure 3:
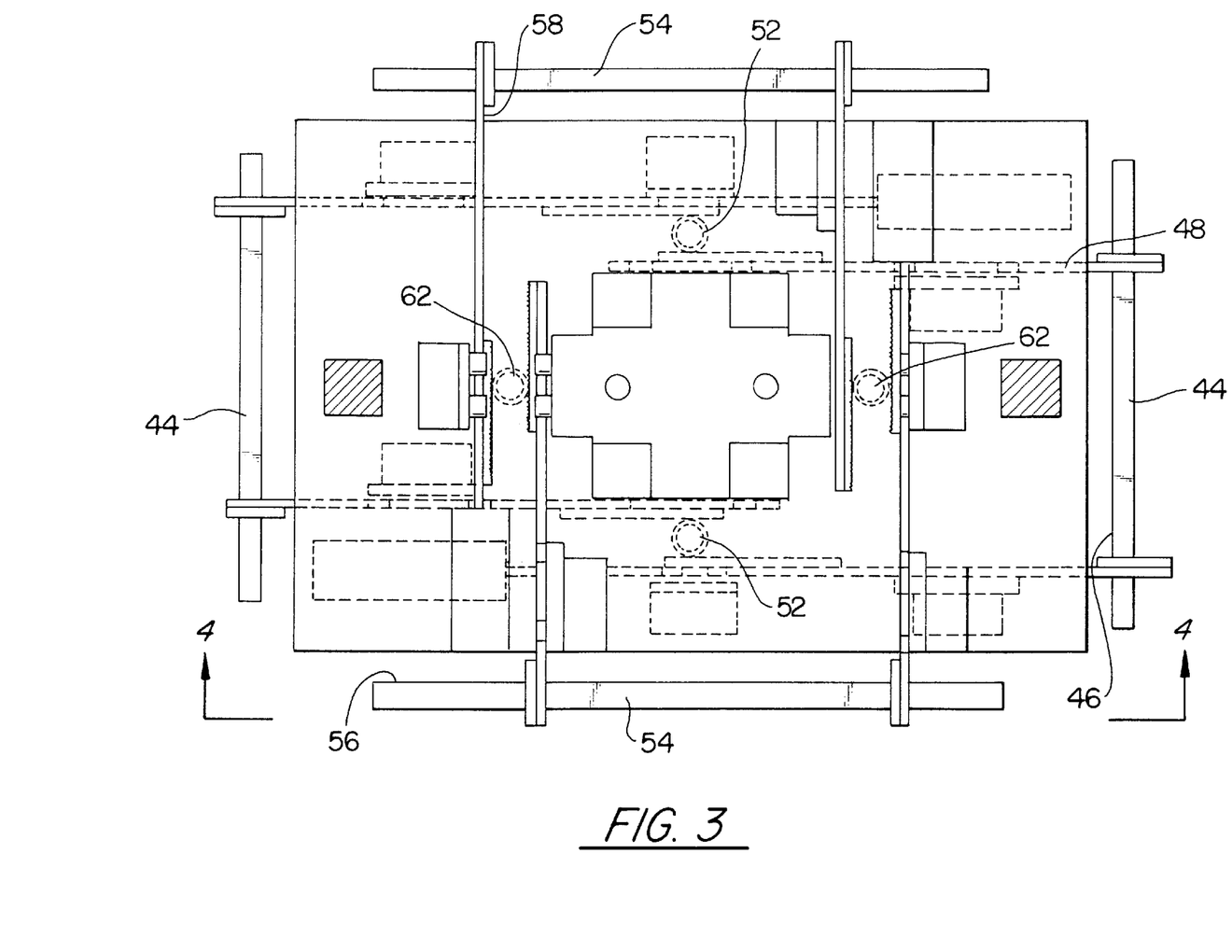
FIG. 3 is a sectional view taken along line 3—3 of FIG. 1.
Figure 4:
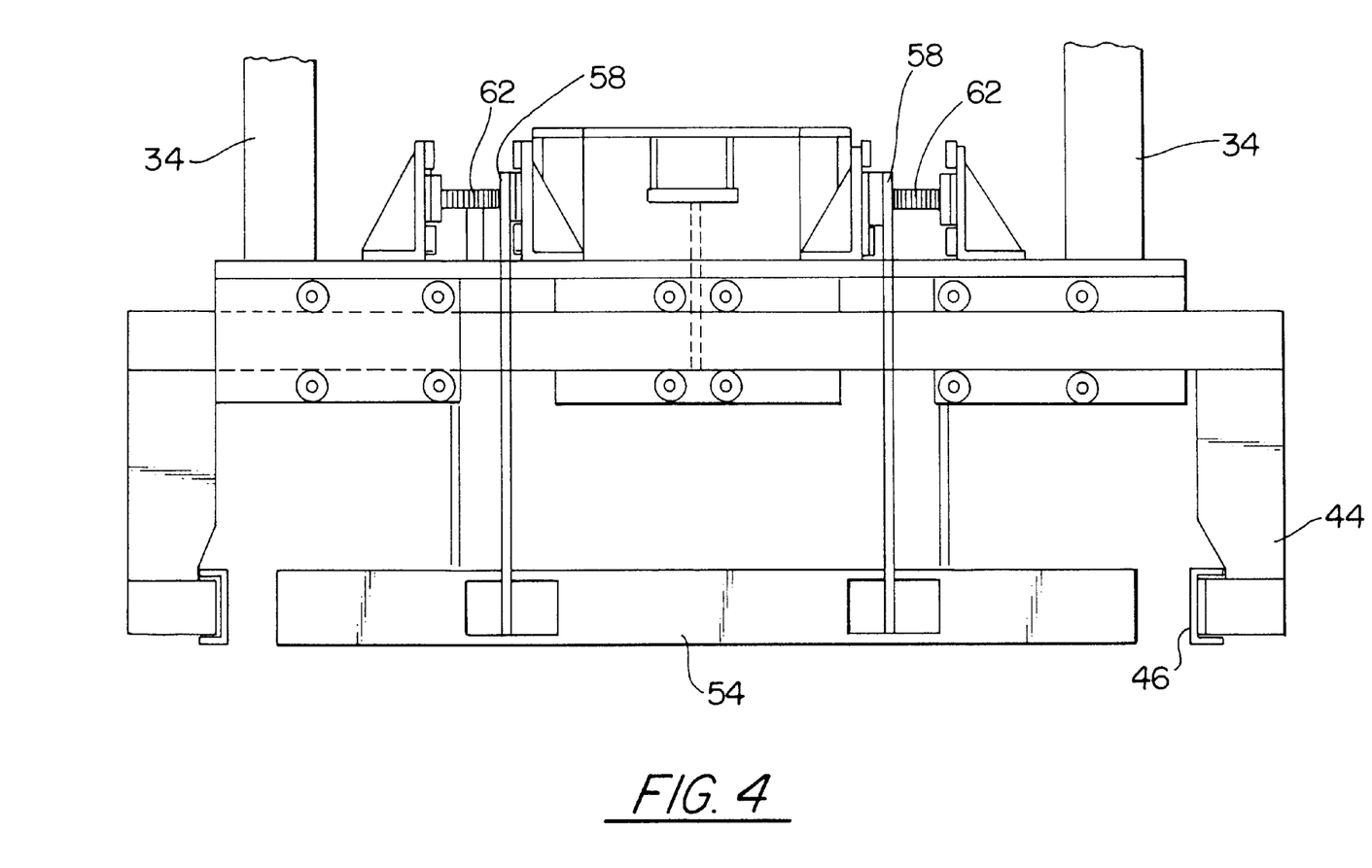
FIG. 4 is a side elevational view of the depalletizer of the present invention.

With reference now to FIG. 3, two pairs of depalletizing arms are illustrated. Each of the arms of the first pair 44 includes an angled abutment surface 46 and two positioning racks 48. Additionally, the first pair of depalletizing arms 44 are geared with respect to one another by way of two pinions 52. Similarly, each of the second pair of depalletizing arms 54 includes an angled abutment surface 56 and two positioning racks 58, with the second pair of depalletizing arms 54 being geared with respect to one another by way of two pinions 62. The gearing ensures equal movement of the opposing pair of arms, 44 and 54 respectively.

Means for powering pinions 52 and 62 provides the force necessary to move arms 44 and 54 inwards to grasp a load or outwards to release a load. For example, activation of an electrical motor operatively connected to pinions 52 and 62 causes inward movement of arms 44 and 54. Reversing the motor supplies a force that moves arms 44 and 54 in the opposite direction (i.e., outwards).

In the preferred embodiment, a load to be grasped is supported with multiple degrees of freedom. In this manner, if a load is slightly mislocated its position can be corrected when the arms 44 and 54 begin their clamping operation. Each of the angled abutment surfaces 46 and 56, are preferably angled within the range of approximately 1-5 degrees. Angling abutment surfaces 46 and 56 in this fashion allows them to properly clamp articles and secure them while the load is moved in the vertical direction.

In the preferred embodiment, the weight of the depalletizer head 38 is reduced by way of a counterbalancing device. One such device takes the form of a series of variable pneumatically-charged cable tensioners 64 (see FIG. 1), each of which includes a pneumatic air reservoir cylinder (e.g., a canister) and a means for engaging cables 66. The variable pneumatically-charged cable tensioners 64 together with cables 66 function essentially as an air pressure spring by exerting a lifting force that offsets the weight of head 38. The lifting force can be varied by changing the air pressure charge in tensioners 64. That is the more air pressure applied, the greater the lifting force.

In one embodiment, cable tensioners 64 are positioned upon the top surface of the depalletizer head 38 and adapted to cooperate with two cables 66. The pair of cables 66 are positioned intermediate cable tensioners 64 and bridge 24. Additionally, cables 66 are adapted to be retracted into the cable tensioners 64 upon the charging of the pneumatic cylinders. In this fashion, cable tensioners 64 counterbalance the weight of depalletizer head 38. As depalletizer head 38 is raised by the motor-driven pinions, the amount of lift provided by cable tensioners 64 is decreased as the cables 66 are retracted into the cable tensioners 64. The air to achieve this is exchanged from the storage chamber (i.e., the pneumatic cylinder) portion of cable tensioners 64 to the means for engaging cables 66. As the pressure drops, so does the lifting capability. When the cables 66 are in the most retracted position, the pressure within the storage chamber is at its lowest pressure. At this time, additional air is added to the chamber to keep the minimum pressure at a predetermined pressure. The pressure within tensioners 64 increases as cables 66 are again extended, reaching a maximum when cables 66 are in the most extended position.

In the preferred embodiment, each of these tensioners 64 has a lifting capacity of approximately 500 pounds when cables 66 are fully extended. The device shown in FIG. 1 has two cable tensioners 64, and thus has a maximum lift (or counterbalance weight) of approximately 1000 pounds. The system is set up for minimal air usage, by means of an on-board air reservoir chamber (e.g., pneumatic cylinders).

In addition to counterbalancing the load lifted by the motor-driven pinions of depalletizer head 38 (hence reducing wear), tensioners 64 also act as a safety mechanism for preventing an uncontrolled descent of depalletizer head 38. That is, if a mechanical failure were to occur as the weight of depalletizer head 38 started down, the pressure within tensioners 64 would automatically increase, thus slowing or even stopping the descent of depalletizer head 38.

Movement of depalletizer head 38 is regulated via a control system including a logic controller (e.g., a computer) that receives, coordinates, and analyzes signals input from location sensing devices (e.g., proximity sensors, quadrature encoders, or servos) and then outputs instructions controlling the movement of the various components of the gantry apparatus 10 that cause head 38 to move. This system ensures the proper orientation between depalletizer head 38, the load to be transported (e.g., a layer of product), the loading site (e.g., a pallet) and unloading site (e.g., a conveyor).

In various embodiments of the invention, several components work cooperatively to regulate the vertical movement and load grasping function of depalletizer head 38. Referring to FIG. 1, sensor 68, which is interconnected to depalletizer head 38, functions in sensing the top of a load. Communicating with sensor 68, the quadrature encoder functions as a positioning indicator. In some embodiments of the invention, similar devices such as servo-drives can be used in place or in addition to the quadrature encoder. The encoder functions by assigning numerical values (or the like) that correlate to specific positions of an object such as head 38. For example, in a preferred embodiment, the quadrature encoder is in operative communication with the head 38 and vertical rails 34 via mechanical coupling to motor driven pinions 40 or 42. As the head 38 moves along vertical rails 34 the encoder changes numerical value (e.g., by rotation caused by its coupling to motor driven pinions 40 or 42) in proportion to the amount of movement. For example, the encoder can have a numerical value of 100 when head 38 is at the uppermost position along vertical rails 34, and a numerical value of 0 when it is at the lowermost position along vertical rails 34. As head 38 descends down rails 34, the numerical value of the encoder decreases. Similarly as head 38 ascends, the numerical value of the encoder increases. Thus, in this example, the encoder would have a numerical value of 50 when head 38 is positioned midway between the uppermost and lowermost position along vertical rails 34.

Information on the various types of loads transported by the depalletizer and, in particular, the quadrature encoder count or numerical value that correlates to a given load type (e.g., six-pack cans or two liter plastic bottles) is stored within the logic controller.

As depalletizer head 38 descends downward towards a palletized load, sensor 68 nears the top of the load. At a predetermined threshold distance, sensor 68 relays a signal to a controller for determining vertical movement (e.g., a computer) that is indicative of the load type. The controller then awaits a signal from the quadrature encoder (e.g., the target numerical value) corresponding to the load type. Depalletizer head 38 descends towards a load until the quadrature encoder reaches the numerical value that corresponds to the position where depalletizer head 38 is adapted to clamp the particular load (e.g., preferably slightly below the bottom surface of the load).

At this point, the controller receives this signal and outputs instructions for head 38 to stop (e.g., by cutting off power to the means for powering shaft 41) and begin grasping the load. Arms 44 and 54 then move inwards until in contact with the layer of articles, thus clamping the load. Preferably, abutment surfaces 46 and 56 are positioned slightly below the bottom of a load to be lifted. The load to be lifted may be slightly mislocated (i.e., off center in relation to depalletizer head 38), as this is corrected first by allowing the surface on which the pallet is resting to float into position as required by depalletizer head 38 when it begins its clamping operation.

The preferred clamping location varies with the specific load type to be lifted, so different load types are identified through controls. When depalletizer head 38 stops its descent, several procedures happen simultaneously. As illustrated in FIG. 3, arms 44 and 54 are guided using hardened linear ways and precision roller bearings, and are mechanically linked through a series of racks (e.g., racks 48 and 58) and pinions (e.g., pinions 52 and 62) to assure accurate clamping. When an appropriate force (e.g., power supplied by an electric motor or a pneumatic charge) is applied to the system, all clamping surfaces move together. If one side comes in contact with an article in the layer before the other side, the layer of product shifts on its floating platform to center it as the arm closes, at first very gently and then more firmly as abutment surfaces 46 and 56 come in contact with the side surfaces of the layer. This operation assures that the layer of product is firmly and accurately located under depalletizer head 38.

Aside from the two pairs of depalletizer arms 44 and 54, additional support for lifting the load can be achieved via an expansible probe lifting assistor 72. The purpose of such probes is to support the center portion of the product layers as may be required for particular layers having openings or hollows in the layer. Although, multiple types of such probes are used within this embodiment, one possible probe type is illustrated with reference to FIG. 1. Such a probe 72 is positioned to depend downward centrally from depalletizer head 38. The preferred probe type is expansible. Specifically, probe 72 is first inserted into a central opening within the pallet to be supported. Thereafter, probe 72 is expanded such that pressure is selectively applied between the center of the load and depalletizing arms 44 and 54.

Probes vary in types and sizes. If a rectangular hole is present in the layer, then a rectangular probe having expanding plates or pads is inserted into the opening. This process can be controlled automatically (e.g., by a computer-controlled system) and designed to occur simultaneously with the clamping operation. As soon as the signal is received that depalletizing arms 44 and 54 are in contact with the layer than the probe plates expand, moving outwardly and thus applying pressure to the sides of the product within the center of the layer. If a circular hole is present, then a round probe is used, which lowers into the hole and has plates or sections which expand outwardly, in a substantially circular fashion to clamp the articles from the center of the layer. Probes having other shapes are also contemplated to be within the invention (e.g., triangular, other polygonal, ovoid, elliptical, irregular, etc.). Alternatively, if the article to be lifted does not have a central opening, an array of suction cups (e.g., a rack of twenty suction cups) can be employed in lifting the article. Use of the latter array will depend on whether or not the proper sized and shaped opening is detected in the layer of articles to be removed.

Figure 5:
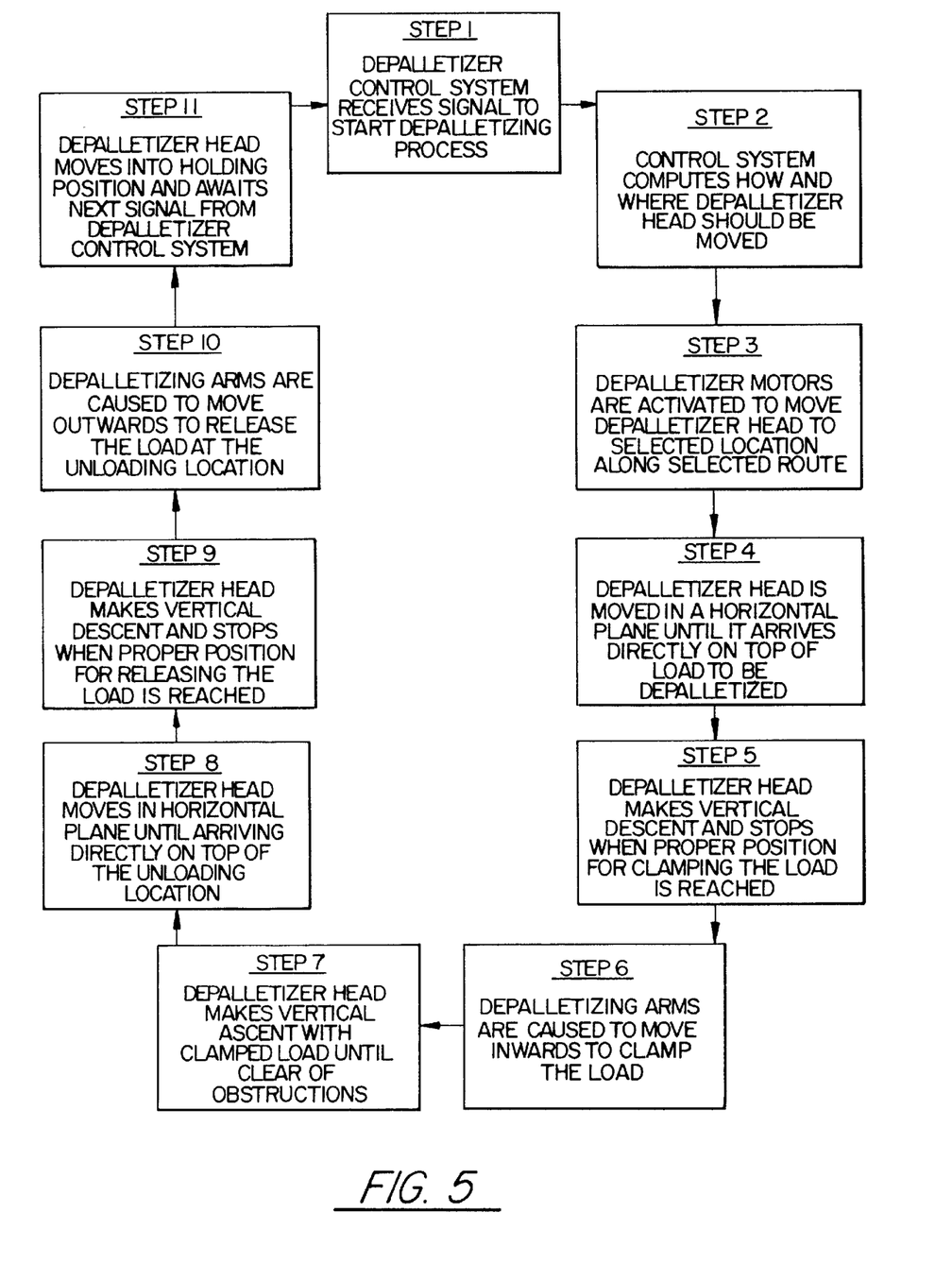
FIG. 5 is a flow chart describing the operation of the present invention.

FIG. 5 outlines the operation of one embodiment of the invention. In Step 1, the depalletizer control system receives a signal (e.g., from a the depalletizer operator or from a control system sensor) that indicates the presence of a load to be depalletized. The control system is a device or compilation of devices which manages the overall operation of the depalletizer (e.g., a computer system with various sensors and servos for controlling the depalletizer). In Step 2, the control system then analyzes the current location of the head in relation to the location to where the head needs to move and then determines the route the depalletizer head 38 should travel to be positioned to act on the load to be depalletized.

In Step 3, the depalletizer motors are activated to move head 38 to the selected location along the chosen route. In Step 4, the depalletizer head is moved in a horizontal plane until it arrives directly on top of the load to be depalletized. By varying the power to the motors, head 38 can rapidly accelerated towards its destination. This acceleration can be varied according to the distance head 38 is to travel. For example, if the head is to travel a relatively long distance, then it can be accelerated more quickly or to a higher velocity. Conversely, if the head is to travel only a short distance, than it can be accelerated more slowly. As head 38 approaches its destination (e.g., as indicated by a specific numerical value of a quadrature encoder), it is decelerated by, for example, de-energizing the motors and/or applying brakes associated with head 38.

In Step 5, after the head is stopped in the horizontal plane, it then begins a vertical descent towards the load to be depalletized. Upon reaching the orientation favorable to engaging the pallet, in Step 6, the clamping process begins. Here, the depalletizer arms move inward to securely clamp the load to be moved. After engaging and clamping the load to be moved, in step 7, head 38 lifts the layer to a clearance height that avoids any obstructions that may be encountered as the head 38 travels to the unloading site. In Step 8, travel in the horizontal plane is enabled and the load is moved toward the unloading location (e.g., a conveyor). When the load is properly positioned over the unloading location, travel in the horizontal plane is halted. Thereupon, in Step 9, the depalletizer head makes a vertical descent and stops when the proper position for releasing the load is reached. Finally, in Step 10, the load is unclamped and released on to the unloading location. In Step 11, the depalletizer head moves to a holding position (e.g., somewhere above the unloading site) where it awaits the next signal from the control system to move or to pick up another load.

This description has been by way of example of how the invention can be carried out. Those of ordinary skill in the art will recognize that various details may be modified in arriving at the other detailed embodiments, and that many of these embodiments will come within the scope of the invention.

Therefore, to apprise the public of the scope of the invention and the embodiments covered by the invention, the following claims are made.

What is claimed is:

1. A gantry depalletizer apparatus for stacking and unstacking storage pallets, the apparatus comprising:

a gantry frame including a first pair of racks disposed in a first direction;

a depalletizer bridge having a pair of pinions for movement along the racks of the gantry frame in the first direction, the bridge including pinions which are movably positioned upon a second pair of racks oriented perpendicular to the first pair of racks, the first and second racks allowing the bridge to move in perpendicular directions in a horizontal plane;

a first and second vertical rail extending downwardly from the bridge, each of the rails having a rack positioned upon an inner face;

a depalletizer head adapted for vertical movement along the vertical rails by way of a first motor driven pinion interconnected to the first vertical rail, and a second motor driven pinion interconnected to the second vertical rail;

a first pair of depalletizing arms, each of the arms including an angled abutment surface and two positioning racks, the first pair of depalletizing arms being geared with respect to one another by way of two pinions;

a second pair of depalletizing arms, each of the arms including an angled abutment surface and two positioning racks, the second pair of depalletizing arms being geared with respect to one another by way of two pinions;

cable tensioners being positioned upon the depalletizer head and having pneumatic cylinders and means for applying force to a cable, a pair of cables positioned intermediate the cable tensioners and the bridge and adapted to be retracted into the cable tensioners upon the charging of the pneumatic cylinders, retraction of the cables into the cable tensioners functioning to counterbalance the weight of the depalletizer head and reduce the load lifted by the motor driven pinions of the depalletizer head;

a sensor interconnected to the depalletizer head for sensing the top of a load to be transported, a controller for determining the vertical movement of the depalletizer head in accordance with signals sent from the sensor;

a probe depending centrally from the depalletizer head, the probe being expansible so as to selectively apply pressure between the center of a load to be transported and the depalletizing arms.

2. A gantry depalletizer apparatus for stacking and unstacking storage pallets, the apparatus comprising:

a gantry frame including a first pair of racks disposed in a first direction;

a depalletizer bridge having a pair of pinions for movement along the racks of the gantry frame in the first direction, the bridge including pinions which are movably positioned upon a second pair of racks oriented perpendicular to the first pair of racks, the first and second racks allowing the bridge to move in perpendicular directions in a horizontal plane;

a first and second vertical rail extending downwardly from the bridge, each of the rails having a rack positioned upon an inner face;

a depalletizer head adapted for vertical movement along the vertical rails by way of a first motor driven pinion interconnected to the first vertical rail, and a second motor driven pinion interconnected to the second vertical rail;

a series of depalletizing arms adapted to engage the sides of a load to be lifted;

a counterbalancing system functioning to reduce the load to be lifted by the motor driven pinions of the depalletizer head.

3. The depalletizing apparatus as described in claim 2 further comprising:

a sensor interconnected to the depalletizer head for sensing the top of a load to be transported, and a controller for determining the vertical movement of the depalletizer head in accordance with signals sent from the sensor.

4. The depalletizing apparatus as described in claim 2 further comprising:

a probe depending centrally from the depalletizer head, the probe being expansible so as to selectively apply pressure between the center of a load to be transported and the depalletizing arms.

5. A gantry depalletizer apparatus for stacking and unstacking storage pallets, the apparatus comprising:

a gantry frame having a pair of racks disposed in a first direction;

a depalletizer bridge adapted for movement in the first direction along the gantry frame, the bridge also adapted for movement in a direction perpendicular to the first;

a first and second vertical rail extending downwardly from the bridge;

a depalletizer head adapted for vertical movement along the vertical rails;

a series of depalletizing arms adapted to engage the sides of a load to be lifted; and a probe depending centrally from the depalletizer head, the probe being expansible so as to selectively apply pressure between the center of the load to be lifted and the depalletizing arms.

* * * * *